March 31, 1936.  E. KARWAT  2,035,550
PROCESS FOR PRODUCING PIG IRON OR STEEL
SIMULTANEOUSLY WITH PORTLAND CEMENT
Filed Dec. 14, 1933  2 Sheets-Sheet 1

Inventor
Ernst Karwat
By Potter Pierce + Scheffler
his attorneys

March 31, 1936.

E. KARWAT 2,035,550

PROCESS FOR PRODUCING PIG IRON OR STEEL
SIMULTANEOUSLY WITH PORTLAND CEMENT

Filed Dec. 14, 1933

2 Sheets-Sheet 2

Inventor:
Ernst Karwat,
By Potter, Pierce & Scheffler,
Attorneys.

Patented Mar. 31, 1936

2,035,550

UNITED STATES PATENT OFFICE 2,035,550

PROCESS FOR PRODUCING PIG IRON OR STEEL SIMULTANEOUSLY WITH PORTLAND CEMENT

Ernst Karwat, Grosshesselohe, near Munich, Germany

Application December 14, 1933, Serial No. 702,413
In Germany January 2, 1933

12 Claims. (Cl. 75—30)

The invention relates to a process of reducing and melting iron ores and especially to the simultaneous production of liquid iron and liquid Portland cement slag with oxygen or oxygen enriched air as blast. An object of the present invention is to perform the reduction of the ore and the melting of the reduced material to Portland cement slag and iron in two separated devices, utilizing the hot melting room waste gases for the reduction of the ores after having cooled them to a temperature at which they are still able to reduce the ores but not to sinter the charge. A further object of the invention is to provide means for adjusting the temperature of the gases for the reducing process.

It is a further object to provide a method for the final treating of the Portland cement slag before tapping.

It is another object of the invention to provide a method for producing iron low in impurities approaching or within the limits of steel thus eliminating the use of the open-hearth process for the production of steel.

Figure 1:
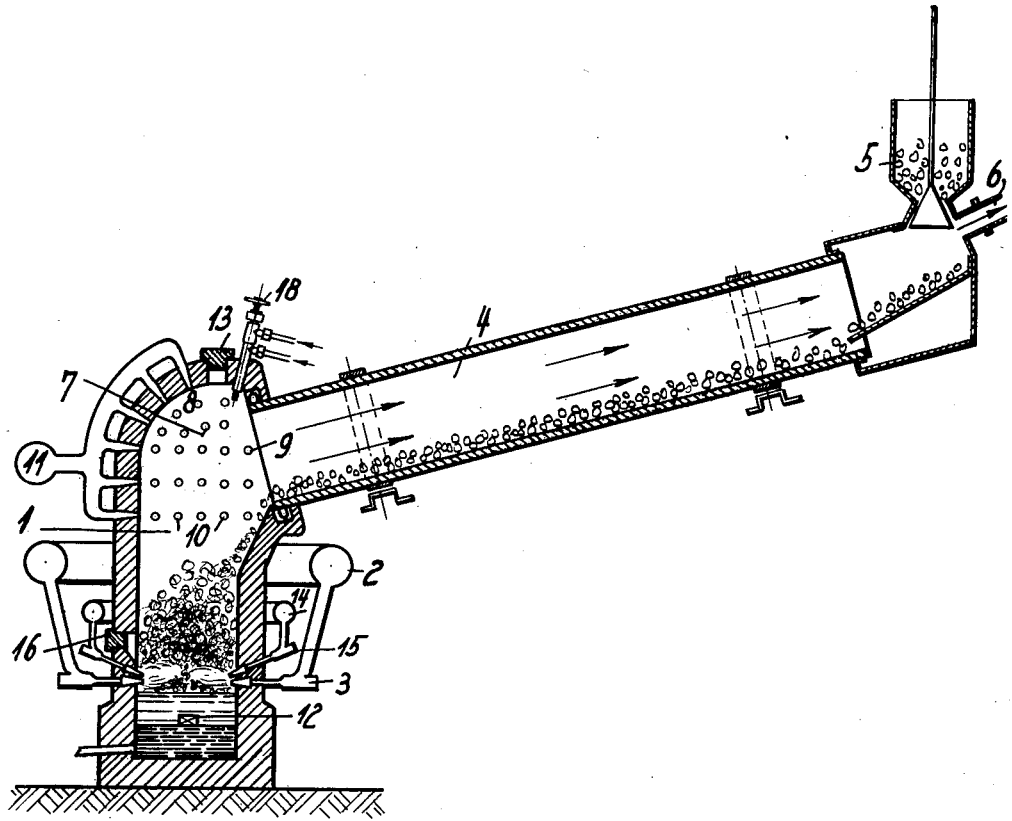
Figure 2:
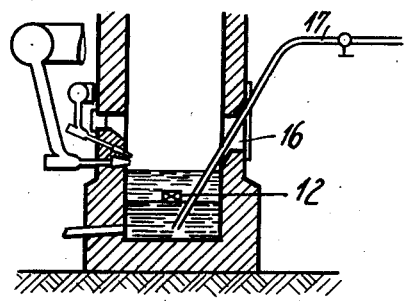
Figure 3:
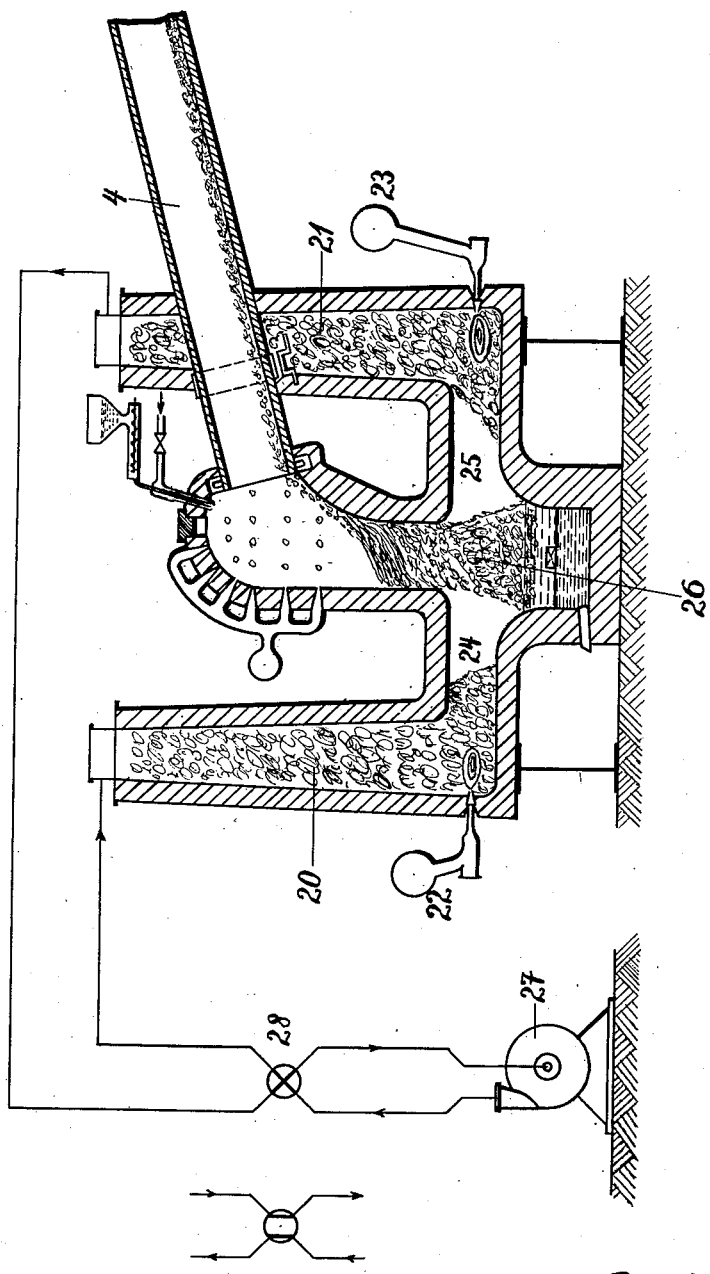

Other and further objects will appear as the description proceeds. The invention will be described with reference to the accompanying drawings in which Fig. 1 is a sectional view of a furnace in which the process according to the present invention may be carried out; Fig. 2 is a transverse sectional view of the melting chamber of the furnace shown in Fig. 1, and Fig. 3 is a sectional view of the furnace for producing steel simultaneously with Portland cement according to the invention.

Referring to the accompanying drawings the process of invention is described in the following example.

In the drawings 1 is a low-shaft furnace used as a melting chamber supplied with a hot air main 2 and a blast connection 3. 4 is a revolving furnace used as a reduction device. 5 is a charging bell for ore and fuel. 6 is a gas passage. 7 is a gas mixing and cooling chamber. 8—10 are openings in the walls of this cooling chamber. These openings are connected with the gas distributing pipe 11. 12 is a slag hole, 13 and 16 are working holes. 14 is a gas pipe, 15 are tuyères for introducing gaseous or liquid fuel or coal dust. Fig. 2 shows a side view of the melting furnace shown in Fig. 1 with the working holes 16 through which tubes 17 can be inserted into the bath of liquid iron.

The mixture of ore and fluxes crushed and mixed with coal is introduced through the charging bell 5 into the revolving furnace 4 in which it is reduced by hot reducing gases coming from the mixing chamber 7. The reduced products and the fuel enter the low shaft furnace. The fuel is burnt with oxygen enriched air to carbon monoxide whereby liquid iron and slag are formed and settle down on the bottom of the hearth. The slag has a melting temperature 200° C. higher than that of normal blast furnace slag. The combustion gases, therefore, leave the melting zone at a temperature of 1500–1700° C., at which temperature without any other measure they would surely cause the charge in the revolving furnace to sinter. Therefore cooling gas from the gas distributing pipe 11 is blown into the mixing chamber through openings 8—10. Thus the temperature of the melting room waste gases is lowered so far that the gas escaping the mixing chamber is still able to reduce the ore in the revolving furnace 4 but is unable to sinter the charge, and it is possible, on the one hand, to maintain in the melting chamber the high temperature necessary for the liquefaction of a Portland cement slag, and, on the other hand, to use the heat and reducing capacity of the melting room waste gases for heating and reducing the ore without being troubled by sticking and hanging of the burden in the reduction process.

As cooling gas a reducing gas is used e. g. the top gas of the revolving furnace escaping at 6 from which, if necessary, carbon dioxide has been removed by known means. The temperature and quantity of the cooling gas are adjusted in such a way that they satisfy the following two requirements:— Firstly the gas must exactly have the temperature required for operation in the reducing furnace. This temperature may vary from 900–1300° C. according to the tendency of the treated materials to sinter and according to the special nature of the reduction process. Secondly the quantity of the gas mixture must be exactly as great as necessary for transmitting the required heat energy to the reduction furnace within the temperature bounds admissible at the two ends of the revolving furnace. For a given melting and reduction capacity and at a given temperature of the blast and a given oxygen concentration, therefore, a single quantity and a single temperature only of the gas to be blown in is admissible.

Before tapping the slag through the slag hole 12 a sample is taken and its composition is controlled e. g. by measuring its viscosity or its temperature. Should the composition of the sample still differ from that required for using the slag as cement corresponding additions of lime or silicon dioxide are introduced into the melting chamber through working holes 13. This possibility to give, still shortly before tapping, the desired composition to the slag is of particular importance for the vendibleness of the slag as cement and facilitates the operation. On producing Portland cement slag in a blast furnace this measure is not possible as the melting room is inaccessible.

In Portland cement the presence of carbides and phosphides is detrimental. These compounds are destroyed before tapping by interrupting the supply of material from the revolving furnace 4, completely burning the fuel still present in the melting room and then oxidizing the slag. There are two oxidizing methods:—Firstly: Ferrous oxides or chlorides, carbonates of the alkali metals or the alkaline earth metals which destroy the carbides and phosphides of the slag are introduced into the melting room through working holes 13. Secondly: introducing combustible gases, liquids, or coal dust through the gas pipe 14 and tuyères 15 into the melting room, and burning them with blast from the connections 3 in such a manner that the products of combustion have an oxidizing effect on the slag whereby the above named impurities of the slag are also destroyed.

During this time oxidizing gases escape the melting room. In the gas mixing chamber 7 coal dust is added to them through the injector 18 thus cooling and reducing them to carbon monoxide. After tapping off the refined slag the supply of reduced material to the melting furnace 1 from the revolving furnace 4 is continued.

The before described methods of oxidizing are also used in order to refine the collected pig iron and thus produce steel. After interrupting the supply of material from the reducing device the main quantity of the Portland cement slag is tapped off. By making appropriate additions to the rest of the slag through working hole 13 the composition of the same is adjusted in such a way that it can be used according to the known principles of steel making for refining the liquid iron with an oxidizing, neutral or reducing flame. This flame is produced by introducing gaseous or liquid fuel or coal dust through tuyères 15 and burning it with oxygen or oxygen enriched air introduced through blast connections 3. It is hereby of special advantage that the liquid pig iron to be refined has a much higher temperature under a cover of Portland cement slag than under a cover of normal slag.

This advantage also makes possible the use of the following refining method:—

Tubes, through which oxygen or oxygen enriched air is forced, are immersed into the bath of the liquid pig iron through openings 16. The impurities of the iron are oxidized and the liquid iron is converted to steel and then tapped off. If desired one can make the melting room tiltable like a convertor and provide a needle bottom (a cast iron bottom fitted with projections for letting in air) for the refining oxygen besides the blast connections 3 for the normal melting blast.

A third method of refining consists in adding unreduced iron ore, cold or preheated or molten, through working holes 13 to the bath of iron and appropriate slag. The reactions of refining: reduction of the ore by the manganese, the silicon, the carbon, and the phosphorus of the pig iron consume much heat at high temperature, which.

as described above, is produced by an oxidizing flame. Another method of producing the heat for the refining reaction is the following:—

Solid fuel is continuously introduced into the melting room either from the revolving furnace 5 together with ore, or from a special fuel shaft arranged laterally over the melting room not shown in the figure, and concentration of the oxygen in the blast that is introduced through the nozzles 3 is so adjusted that the flame of the solid fuel, burning with the oxygen, supplies the heat necessary for the refining reactions at high temperatures.

By this method the quantity of fuel present in the melting room can be reduced to a minimum. The gaseous atmosphere in the melting room may be made reducing, neutral or oxidizing in relation to iron and slag. Ore and fuel may be continually introduced into the melting chamber, and it is not necessary to interrupt the supply. In case it is desired to reduce or to keep away completely the solid fuel from the melting room one works in the following manner:—

The solid fuel preheated by melting room waste gases is burned outside the furnace itself and the hot combustion products which may be oxidizing, neutral or reducing in their effect are directly blown into the melting room where they melt iron and slag. By this working method considerable losses of heat arise in the waste gases leaving the revolving furnace and the fuel preheating shaft. A perfect heat balance is attained by the following method (see Fig. 3):—The fuel to be preheated and to be burned to carbon monoxide externally of the melting furnace is filled into two shafts 20 and 21 and ore alone or ore with a little solid fuel is charged into the revolving furnace 4. At the bottoms of the shafts 20 and 21 tuyères 22 and 23 for the blast are arranged and opposite of these are channels 24 and 25 leading the hot gases to the melting chamber 26. Uncooled melting room waste gas is withdrawn from the melting room 26 through one of the fuel shafts whereby it preheats the fuel and cools itself. It leaves the fuel shaft at the top and is introduced from above into the other fuel shaft by a blower 27, passes this shaft in downward direction, mixes at the bottom of the shaft with the hot gases there produced by combustion of fuel with oxygen enriched air and then again enters the melting room. At regular intervals these fuel shafts 20 and 21 thus acting as gas cooler and gas heater are alternately operated in the manner described by operation of the device 28. The iron molten in such a manner has a low content of carbon and may easily be refined in the melting room by temporarily working with an oxidizing or neutral flame.

It is to be understood that within the scope of the invention each method of working may be included in which melting and reduction are performed in separate devices and in which the melting room waste gases are cooled before being introduced into the reduction process. As a cooling agent water vapor, carbon dioxide or gases containing the same together with coal dust which converts them to carbon monoxide and hydrogen can be used instead of a reducing gas. The enrichment of the reducing gas with hydrogen is of special advantage as mixtures of hydrogen and carbon monoxide only, but not carbon monoxide alone are capable of reducing the ore perfectly in the reduction process.

When using water vapor or carbon dioxide with coal dust as cooling agents small quantities of them are sufficient for cooling particularly great quantities of melting room waste gas, and the quantity of gases passing the revolving furnace becomes a minimum. The melting room waste gases can also be cooled by heat exchange with the blast which thereby is heated.

In order to avoid detrimentally high flame temperatures when the oxygen concentration in the blast is high a portion of the injecting gases may be introduced, in cold or hot condition, into the melting room together with the blast or through special tuyères, and only the remainder is blown into the mixing room. A simple regulation of the heat balances of the melting and reduction room is possible by varying the proportions of the injecting gas blown into these two rooms.

In the revolving furnace there may be taken all measures which, in relation to the production of Portland cement or spongy iron, have been proposed for heat exchange or heat balance. For controlling the heat exchange in the revolving furnace there may be advantageously used the methods which are well-known in the manufacture of cement. With this process there may be combined a presintering or roasting of the ore before it is introduced into the revolving furnace.

The use of oxygen or oxygen enriched air will be necessary only in the production of Portland cement slag in order to save fuel. It may be of advantage for the described refining processes though these refining processes may also be performed with air as a blast. Nor is it necessary to treat the ore, as described, together with fuel in the reduction device. The fuel before being introduced into the melting chamber may be preheated separately from the ore by melting-room waste gases which in this case need no preceding cooling. Instead of the device shown in the drawings, any arrangement can be used that permits reducing and smelting in chambers separated from each other and having a gas mixing chamber arranged in between in which the gases passing over from the smelting chamber into the reducing chamber are cooled according to the invention.

What I claim is:—

1. Process for producing pig iron simultaneously with Portland cement slag which comprises heating and reducing iron ore and lime in a reducing chamber, transferring the reduced ore to a melting chamber and melting it therein by burning a fuel to carbon monoxide with a mixture of air and oxygen, cooling the waste gases of the melting chamber by admixing therewith a cooling gas down to a temperature at which they cannot sinter the ore and using them to reduce and heat the ore in the reducing chamber.

2. Process for producing pig iron simultaneously with Portland cement slag which comprises heating and reducing iron ore and lime in a reducing chamber, transferring the reduced ore to a melting chamber and melting it therein by burning a fuel to carbon monoxide with a mixture of air and oxygen, cooling the waste gases of the melting chamber down to a temperature at which they cannot sinter the ore by admixing therewith reducing gases in a mixing chamber functionally disposed between the reducing chamber and the melting chamber before using them to reduce and heat the ore.

3. Process for producing pig iron simultaneously with Portland cement slag which comprises heating and reducing iron ore and lime in a reducing chamber, transferring the reduced ore to a melting chamber and melting it therein by burning a fuel to carbon monoxide with a mixture of air and oxygen, cooling the waste gases of the melting chamber down to a temperature at which they cannot sinter the ore by admixing therewith carbon dioxide together with coal dust in a mixing chamber functionally disposed between the reducing chamber and the melting chamber before using them to reduce and heat the ore.

4. Process for producing pig iron simultaneously with Portland cement slag which comprises heating and reducing iron ore and lime in a reducing chamber, transferring the reduced ore to a melting chamber and melting it therein by burning a fuel to carbon monoxide with a mixture of air and oxygen, cooling the waste gases of the melting chamber down to a temperature at which they cannot sinter the ore by admixing therewith water vapor together with coal dust in a mixing chamber functionally disposed between the reducing chamber and the melting chamber before using them to reduce and heat the ore.

5. Process for producing pig iron simultaneously with Portland cement slag which comprises heating and reducing iron ore and lime in a reducing chamber, transferring the reduced ore to a melting chamber and melting it therein by burning a fuel to carbon monoxide with a mixture of air and oxygen, cooling the flame by introducing one portion of a cooling gas into the melting chamber and cooling the waste gases of the melting chamber by introducing another portion of the cooling gas into a mixing chamber functionally disposed between the reducing chamber and the melting chamber, and using the cooled waste gases of the melting chamber to reduce and heat the ore.

6. Process for producing pig iron simultaneously with Portland cement slag which comprises heating and reducing iron ore and lime in a reducing chamber, transferring the reduced ore to a melting chamber and melting it therein by burning a fuel to carbon monoxide with a mixture of air and oxygen, cooling the waste gases of the melting chamber by introducing cooling gases into a mixing chamber functionally disposed between the reducing chamber and the melting chamber in such a way that they protect the walls of the mixing chamber against the attack of the hot gases, and using the cooled waste gases to reduce and heat the ore.

7. Process for producing steel simultaneously with Portland cement which comprises heating and reducing iron ore and lime in a reducing chamber, transferring the reduced ore into a melting chamber and melting it therein by burning a fuel with a mixture of air and oxygen to a mixture of carbon monoxide and carbon dioxide which refines the molten iron, cooling the waste gases of the melting chamber by reducing the carbon dioxide contained therein by the addition of coal dust down to a temperature at which they cannot sinter the ore, and using them to heat and reduce the ore.

8. Process for producing steel simultaneously with Portland cement which comprises heating and reducing iron ore and lime in a reducing chamber, transferring the reduced ore to a melting chamber and melting it therein by burning a fuel with a mixture of air and oxygen, taking off the main portion of the molten slag, refining the molten iron by adding iron oxide, cooling the waste gases of the melting chamber down to a temperature at which they cannot sinter the ore and using them to reduce and heat the ore.

9. Process for producing steel simultaneously with Portland cement which comprises heating and reducing iron ore and lime in a reducing chamber, transferring the reduced ore to a melting chamber and melting it therein by burning the fuel to carbon monoxide with a mixture of air and oxygen, taking off the main portion of the molten slag, refining the molten iron by injecting oxygen enriched air into it, cooling the waste gases of the melting chamber down to a temperature at which they cannot sinter the ore, and using them to reduce and heat the ore.

10. Process for producing steel simultaneously with Portland cement which comprises heating and reducing iron ore and lime in a reducing chamber, transferring the reduced ore into a melting chamber and melting it therein by burning a fuel to carbon monoxide with a mixture of air and oxygen, interrupting the supply of reduced ore and fuel to the melting chamber, taking off the main portion of the slag, refining the molten iron, cooling the waste gases of the melting chamber down to a temperature at which they cannot sinter the ore, and using them to reduce and heat the ore.

11. Process for producing steel simultaneously with Portland cement slag which comprises heating and reducing iron ore and lime in a reducing chamber, transferring the reduced ore into a melting chamber and melting it therein by hot gases produced by combustion of fuel with oxygen enriched air outside the melting chamber, cooling a portion of the waste gases of the melting chamber down to a temperature at which they cannot sinter the ore, and using them to reduce and heat the ore.

12. Process for producing pig iron simultaneously with Portland cement slag which comprises heating and reducing the ore in a reducing chamber, transferring the reduced ore into a melting chamber and melting it therein by burning a fuel with a mixture of air and oxygen, oxidizing the impurities of the molten slag, cooling the waste gases of the melting chamber by admixing therewith cooling gases down to a temperature at which they cannot sinter the ore, and using them to reduce and heat the ore.

ERNST KARWAT.